Jan. 13, 1970  R. F. KOVACS ET AL  3,489,367
EMERGENCY LOCKING RETRACTOR

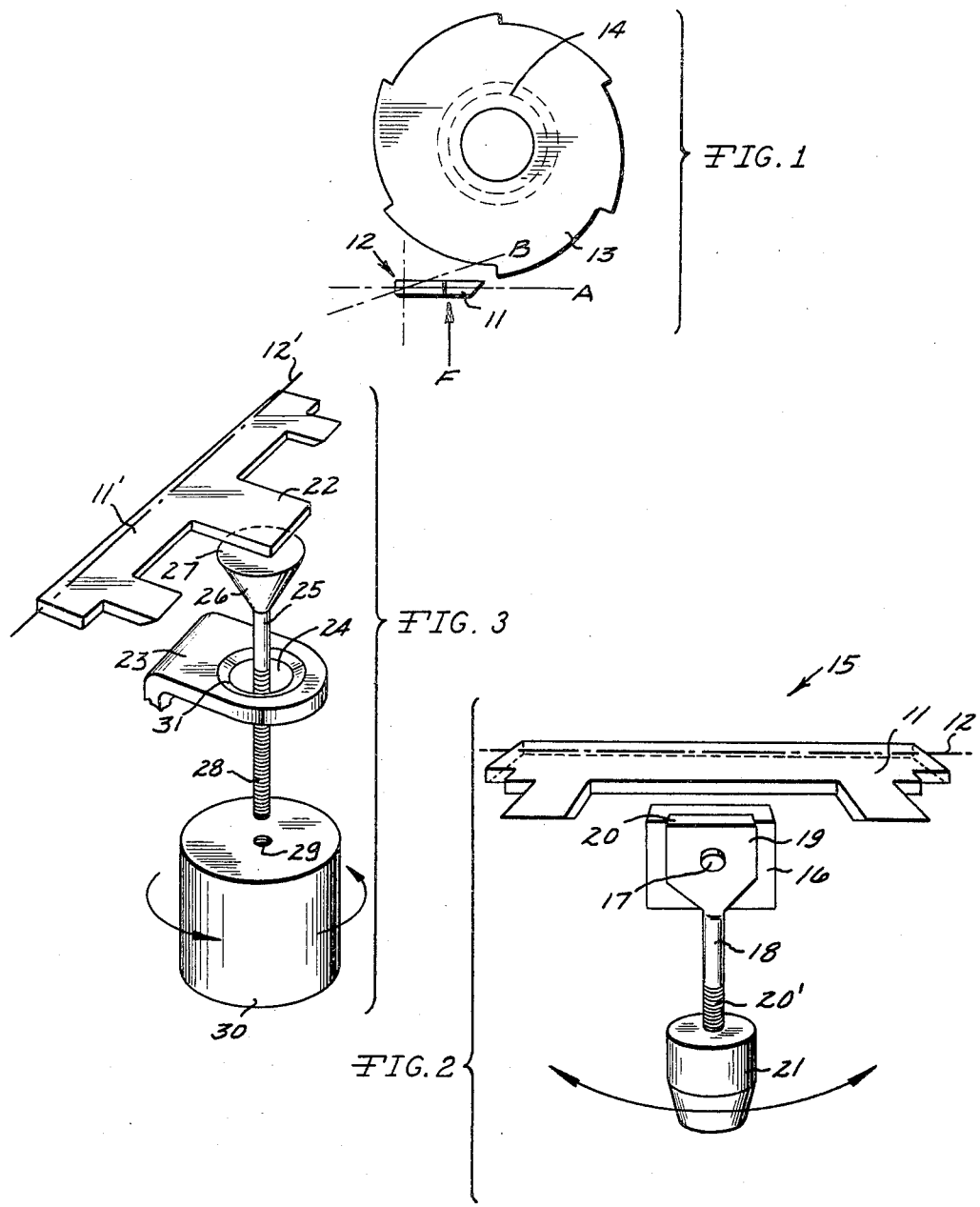

Filed Nov. 17, 1967  3 Sheets-Sheet 2

INVENTORS
ROY F. KOVACS
DAVID L. LANG
JAMES T. LIGON
BY
Miller Morris Pappas & McLeod
ATTORNEYS INVENTORS
ROY F. KOVACS
DAVID L. LANG
JAMES T. LIGON
BY Miller Morriss Pappas & McLeod
ATTORNEYS

United States Patent Office 3,489,367
Patented Jan. 13, 1970

3,489,367
EMERGENCY LOCKING RETRACTOR
Roy F. Kovacs, Royal Oak, David L. Lang, Rochester, and James T. Ligon, Almont, Mich., assignors, by mesne assignments, to The Firestone Tire & Rubber Company, Akron, Ohio, a corporation of Ohio
Continuation-in-part of application Ser. No. 624,259, Mar. 20, 1967. This application Nov. 17, 1967, Ser. No. 683,862
Int. Cl. B65h 75/48
U.S. Cl. 242—107.4                        3 Claims

ABSTRACT OF THE DISCLOSURE

A position sensitive improvement for retractor reels and in particular reels of the type described and claimed in our copending application Ser. No. 624,259 filed on Mar. 20, 1967, entitled Emergency Locking Retractor. The improvement comprises a multidirectional deceleration sensor embodied in a depending mass pivotal beneath the locking bar and upon deceleration the sensor is engageable with the locking bar to tilt it into pawl lock engagement with the ratchet flanges of an adjacent reel structure thereby blocking the paying out of cable or web belting in safety restraint applications. The mass depends vertically and upon deviation from this position trips the latch bar to lock position.

---

This application is a continuation-in-part application based upon the Emergency Locking Retractor, Ser. No. 624,259 filed on Mar. 20, 1967, by us and showing a retractor lock structure in which a lock bar, including pawl faces, is tiltable into lock engagement with registering ratchet faced flanges on a storage reel for webbing or cable and the like as used in safety belts, particularly automotive and aircraft safety restraints of the shoulder and/or lap type.

By utilization of the locking bar which tilts with a very small initiating force into locking contact with the reel flanges the prior structure is made amenable to a double-lock or a supplemental safety lock energized by a change in velocity or acceleration of the vehicle and not wholly dependent upon the movement of the torso of the wearer.

Accordingly, the present invention is directed to an acceleration or deceleration sensing structure energized by a rate change in a forward or reverse movement of the vehicle such as automobile or aircraft and in a modification to any rate change in any direction.

An additional object is to provide a position sensitive structure for location in a vehicle.

An object of the invention is to provide a simple double lock acting on a bar type lock structure.

Another object is to provide an acceleration or deceleration sensing structure acting directly against the lock bar.

Still another object is to provide a sensing structure in which the sensitivity is adjustable by change of location of mass center.

Other objects including simple structural integration in retractor reel structures will be apparent to those skilled in the art as the description proceeds.

GENERAL DESCRIPTION

In general the present invention is directed to emergency locking retractors and reels of the type described by us in our copending application Ser. No. 624,259 filed on Mar. 20, 1967. In such devices a receptacle of spool for webbing or cable is journalled between the upstanding legs of a channel-like frame. The flanges of the spool are provided with peripheral ratchet faces. A lock bar also extends across the channel-like frame parallel to the axis of the reel or spool and is tiltable toward and away from interference engagement with the ratchet flanges of the spool. A rewind mechanism applies a coiling or return bias to the spool. A clutch structure sensitive to rate change allows the webbing to be freely withdrawn at a relatively constant rate. However, if a sudden change in rate of withdrawal occurs then the lock bar is tilted into locking engagement with the flanges of the spool by the clutch and lock up forces are symmetrically conducted to the frame. At lock-up no stresses are transmitted to the clutch. The translated clutch force acting through the lever serving the lock-bar is of a very low order. Accordingly, supplemental or complemental locking structures are made possible in which a pendulum or inertia responsive type of suspended mass acts on the lock bar independent of the clutch and lever to tilt the lock bar into locking engagement with the ratchet flanges. An elongate lock bar tiltable on an axis adjacent one edge is provided which upon tilting engages an adjacent ratchet flanged drum. An inertia structure is registrably and pivotally suspended beneath the lock bar and includes an upper part which, when tilted, engages the lock bar at a point offset from the tilt axis. Thus, in a cam-like manner, the bar is tilted by the inertia structure to lock position in response to inertia imbalance. Ultimate locking occurs with symmetrical distribution of forces and without damage to the clutch or retractor structure of the reel. The structural innovation necessary is relatively simple and the resulting reel structure is provided with an added parameter of safety. Hence, the reel structure is provided with plural safety lock features and may be viewed as a multi directional deceleration sensor.

IN THE DRAWINGS

FIGURE 1 is a partial schematic end elevation view of ratchet flange and tiltable lock bar and indicating by alternate positions on the pivot axis the engaged position of the latch bar on locking.

FIGURE 2 is an exploded perspective view of a pendulum swinging on a horizontal pivot in a plane path, the upper cam portion arranged to tilt the latch bar toward engagement with the ratchet flange faces of the spool or reel.

FIGURE 3 is an exploded perspective of a modified latch bar suspended over a truncated cone universally movable in a fixture and where movement is imparted by a depending mass or weight normally vertically oriented on a rod common to the cone piece.

SPECIFIC DESCRIPTION

Figure 5:
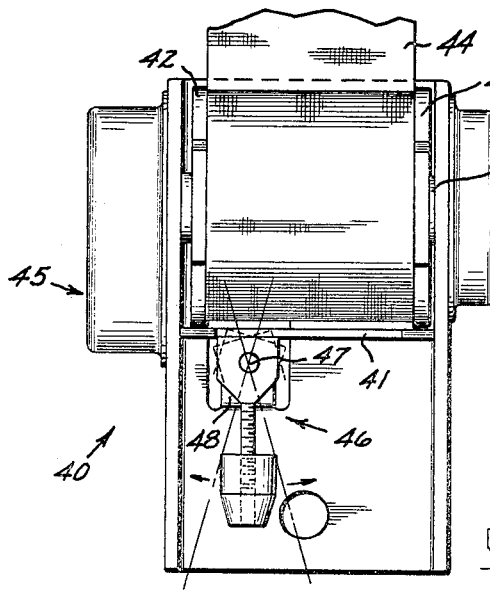
FIGURE 5 is a front elevation view of the structure shown in FIGURE 4.

In the drawings and particularly in reference to FIGURE 1 thereof, the concept of utilizing a pawl type lock or latch bar 11, tiltable on an axis 12 to interference block engagement with a ratchet faced flange 13 is shown. In application Ser. No. 624,259 (supra) such a structure for locking the ratchet flanges 13 was disclosed and the tilting of the lock bar 11 was accomplished by a light clutch bias. In the present invention a force bias F independent of clutch bias is applied to the lock bar 11 offset from the tilt axis 12 and which moves the lock bar 11 to engaging or lock position B and from its rest position A. In actual usage the flanges 13 comprise identical spaced apart flanges on a storage drum 14 as for web belting or cable.

By reference to FIGURE 2 a structure 15 in accord with the present invention for application of the eccentrically applied force F is shown. The lock bar 11 is shown in its rest position (position A of FIGURE 1) and a bracket 16 is positioned beneath the lock bar 11. A pivot pin 17 extends transversely from the bracket 16 to provide a pivot for the rigid lever arm 18.

The lever arm 18 can thus pivot freely on the pin 17 and the upper portion 19 of the arm 18 is extended or flared. The upper surface 20 of the arm 18 accordingly extends beyond the bracket 16 when the arm is tilted and the surface 20 in such instances engages the underside of the lock bar 11 in a position eccentric to the pivot axis 12 of the lock bar 11, thereby tilting the lock bar 11 into interference engagement with the ratchet flange 13 (as seen in position B of FIGURE 1). Hence the structure of FIGURE 2 provides the means to apply the force F as seen in FIGURE 1 for selectively blocking rotation of the ratchet flanges 13 in one direction. The magnitude of the force F is made adjustable in the structure of FIGURE 2 by providing the depending portion of the arm 18 with threads 20' and allowing the mass or weight 21 to be varied in set position on the arm 18. This provides a depending mass sensitive inertially to movement in the direction of a plane transverse to the axis of the pivot pin 17 and parallel to the pivotal axis 12 of the lock bar 11. A mating threaded opening is provided axially through the mass 21.

A modification of the structure of FIGURE 2 is indicated in FIGURE 3. The lock bar 11' is provided with a plane extension 22 intermediate the ends thereof. A bracket 23 is then provided beneath the extension 22. The bracket includes an opening 24, therethrough which is registrably beneath and generally parallel to the plane extension 22. A lever arm 25 extends axially through the opening 24 and the arm 25 includes an inverted conic head 26. In the inverted position the base 27 of the conic head 26 lies normally parallel to the undersurface of the plane extension 22. A flatted or truncated spheroidal surface is also contemplated and may provide the head portion 26 of the arm 25. The depending shank 28 of the arm 25 is threaded and is threadably inserted in the axial opening 29 extending through the mass of weight 30. This allows the sensitivity of the structure of FIGURE 3 to be adjusted in accord with the selected location of the weight 30 on the threaded shank 28. In accord with inertial concepts the mass 30 may be displaced from the vertical depending position shown in accord with acceleration or deceleration of a vehicle in any direction in which such structure is positioned. When such displacement occurs the head 26 tilts in the seat 31 and the flat surface 27 impinges on and moves toward the plane extension 22 and such eccentric application of force to the lock bar 11' causes it to tilt on its axis toward lock engagement with the ratchet flange as seen in FIGURE 1. The plane extension 22 assures that the application of locking force to the lock bar 11 occurs at a position offset from the pivot axis 12'.

While the structure of FIGURE 2 is responsive only to forces within the plane of movement of the arm 18, the structure of FIGURE 3 is more universally sensitive to forces radially operable on the mass 30. The eccentric application of locking force is available to the lock bars 11 and 11', in both modifications in accord with the force F in FIGURE 1.

Figure 4:
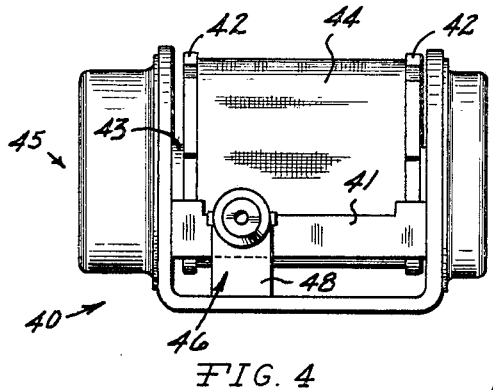
FIGURE 4 is a bottom plan view of a retractor reel structure and including the pendulum structure of FIGURE 2 related to the lock bar.

FIGURES 4 and 5 illustrate application of the structure described in FIGURE 2 in a retracting reel 40 in which lock bar 41 is positioned to tilt into blocking engagement with ratchet flanges 42 on a drum 43 carrying web belting 44. In this device the clutch assembly in housing 45 senses rate change of belt movement and applies a tilt bias to the lock bar 41. The inertia assembly 46 as described in reference to FIGURE 2 and pivotal on the pin 47 of bracket 48 is also available in supplement or complement to the clutch force and is sensitive to inertial application of forces.

Figure 6:
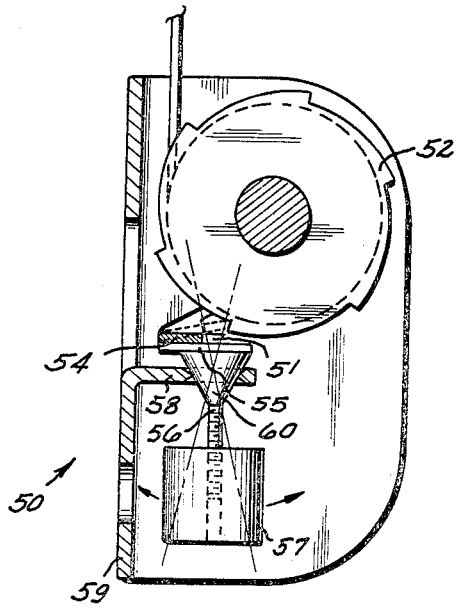
FIGURE 6 is a partial side elevation section through a reel as seen in universal pendulum of FIGURE 3.
Figure 7:
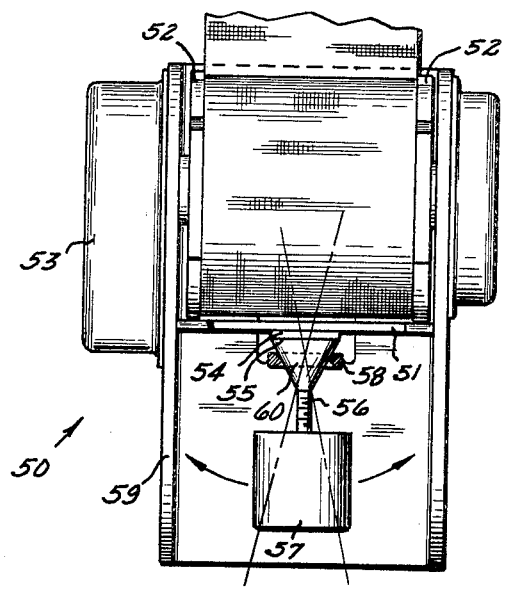
FIGURE 7 is a front elevation view of the structure seen in FIGURE 6 and indicating the universal movement of the pendulum causing locking of the latch bar.

Similarly the FIGURES 6 and 7 illuminate the structure of FIGURE 3 as applied in a retractor reel 50 in which the lock bar 51 is tiltable by a clutch structure into locking engagement with the ratchet flanges 52. The clutch structure is located in housing 53. The plane extension or pad 54 extends from the lock bar 51. The flat surface 55 of the universally movable arm 56 is registrably beneath the plane extension 54 so that when the mass 57 is moved relatively from the vertical depending position the lock bar 51 is tilted into lock engagement with the ratchet flanges 52 by impingement of the up tilted edge of the flat surface 55 on the plane extension 54. The bracket 58 formed from the reel frame 59 supports the conical or spherical surfaced head 60 of the arm 56.

Figure 8:
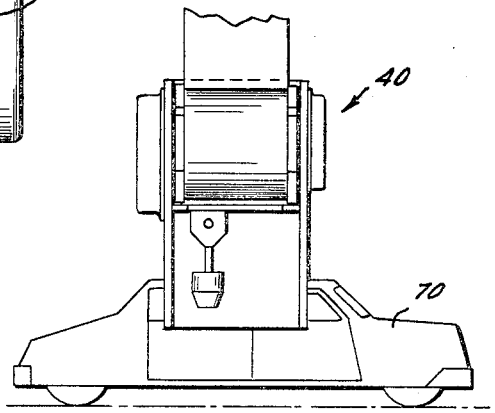
FIGURE 8 is a schematic sketch indicating the vertical orientation of the pendulum structure of FIGURE 2 and indicating that the plane of pivoting is desirably parallel to the line of motion of the vehicle.

In FIGURE 8 the reel structure 40 of FIGURES 4 and 5 is shown as relatively mounted in an automobile 70 so that the plane of movement of the mass is parallel to the direction of normal travel of the vehicle. Hence, as applied to seat belts and the like the reel 40 is locked on acceleration or deceleration of the vehicle in a rearward or forward direction. At rest the depending mass on the arm must be vertical or approximate vertical.

Figure 9:
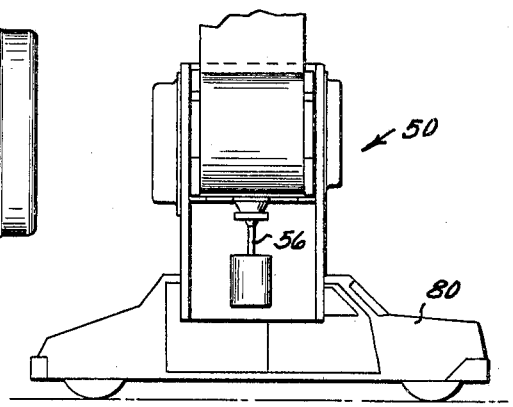
FIGURE 9 is a schematic sketch indicating the vertical orientation of the pendulum in a mounting within a vehicle but non critical with regard to the plane of pendulum swing, since the pendulum has limited universal movement and in every position deviation from the vertical locks the retractor lock bar.

In FIGURE 9, the reel structure 50 of the present invention is shown in relative installed position in the vehicle 80. While this device 50 is sensitive as the device 40 it can also sense sidewise acceleration or deceleration or imbalance of force radially applied in respect to the depending mass. Hence the reel structure 50 can be rotated 90 degrees in its position as shown without loss of its lock sensing capabilities. In fact, the reel structure 50 is positioned insensitive in the vehicle provided, of course, that the normal or rest position of the arm 56 is vertical as shown.

By spacing as between the lock bar and the contacting sensor head surface the lock bars can be rendered insensitive to displacement occurring on ordinary or usual grades. In certain instances, as for example to satisfy space limitations, the depending mass providing the inertial control over the lock bar may be located otherwise than directly beneath the lock bar, but its movement is effective upon the lock bar as seen in FIGURE 1.

Having thus described our invention, operable separately on tiltable lock bars or complementing clutch actuation, the invention may be modified, improved and changed and such modifications, changes and improvements within the skill of the art are intended to be included within the spirit of the invention.

We claim:

1. In a double locking retracting reel structure of the type including ratchet faced spool flanges and a lock bar tiltable into simultaneous engagement with said ratchet faced flanges, the combination including:
   a support frame;
   a flanged drum supported in said frame for rotation in respect thereto, the flanges of said drum including ratchet faces;
   a lock bar adjacent said drum and parallel thereto and pivotally supported on an axis by said frame to tilt into locking registering engagement with said ratchet faces;
   a pivot below said lock bar and supported by said frame;

an inertia element pivotal on said pivot and including a depending mass and a rigid link connected to an upper cam surface normally paralleling said lock bar, but upon displacement of said mass a portion of said cam surface rises to engage said lock bar at a point offset from said axis of said lock bar whereby said lock bar is tilted by said cam surface into lock engagement with said ratchet faces, and means separate from said inertia element tiltably engaging said lock bar upon movement of the torso of the wearer.

2. A double locking retracting reel structure as set forth in claim 1 wherein said pivot of the inertia element is universally movable.

3. A double locking retracting reel structure as set forth in claim 1 wherein said mass of the inertia element is adjustably positioned in respect to said rigid link.

References Cited

UNITED STATES PATENTS

| | | | |
|---|---|---|---|
| 2,569,020 | 9/1951 | Rotherham | 242—107.4 |
| 3,226,053 | 12/1965 | Petty | 242—107.4 |
| 3,338,532 | 8/1967 | Board et al. | 242—107.4 |
| 3,343,765 | 9/1967 | Baker | 242—107.4 |
| 3,348,789 | 10/1967 | Hirsch | 242—107.4 |

FOREIGN PATENTS 1,018,955  2/1966  Great Britain.

STANLEY N. GILREATH, Primary Examiner

W. H. SCHROEDER, Assistant Examiner